(12) United States Patent
Attwell

(10) Patent No.: US 10,372,309 B2
(45) Date of Patent: Aug. 6, 2019

(54) METHOD AND SYSTEM FOR CONTROLLING A SCHEDULING ORDER OF MULTIMEDIA CONTENT FOR A BROADCAST

(71) Applicant: iHeartMedia Management Services, Inc., San Antonio, TX (US)

(72) Inventor: Nigel Attwell, Goldens Bridge, NY (US)

(73) Assignee: iHeartMedia Management Services, Inc., San Antonio, TX (US)

(*) Notice: Subject to any disclaimer, the term of this patent is extended or adjusted under 35 U.S.C. 154(b) by 452 days.

(21) Appl. No.: 14/837,976

(22) Filed: Aug. 27, 2015

(65) Prior Publication Data

US 2015/0370457 A1    Dec. 24, 2015

Related U.S. Application Data

(63) Continuation of application No. 13/940,877, filed on Jul. 12, 2013, now Pat. No. 9,152,296, which is a continuation of application No. 12/914,000, filed on Oct. 28, 2010, now Pat. No. 8,490,099, which is a continuation-in-part of application No. 12/856,952, filed on Aug. 16, 2010, now Pat. No. 8,418,182.

(51) Int. Cl.

| G06F 9/46 | (2006.01) |
|---|---|
| G06F 3/0484 | (2013.01) |
| H04H 60/06 | (2008.01) |
| G06F 3/0481 | (2013.01) |
| H04H 60/47 | (2008.01) |

(52) U.S. Cl.
CPC ........ *G06F 3/04842* (2013.01); *G06F 3/0481* (2013.01); *H04H 60/06* (2013.01); *H04H 60/47* (2013.01)

(58) Field of Classification Search
CPC ... G06F 3/04842; G06F 3/0481; H04H 60/06; H04H 60/47
See application file for complete search history.

(56) References Cited

U.S. PATENT DOCUMENTS

| 6,968,364 B1 | 11/2005 | Wong et al. |
|---|---|---|
| 7,412,532 B2 | 8/2008 | Gondhalekar et al. |
| 7,610,011 B2 | 10/2009 | Albrett |
| 8,180,469 B1 | 5/2012 | Fitch et al. |
| 8,401,072 B2 | 3/2013 | Shibata et al. |
| 8,418,182 B2 | 4/2013 | Attwell |
| 2002/0023274 A1 | 2/2002 | Giacalone |
| 2002/0138630 A1 | 9/2002 | Solomon et al. |
| 2002/0161890 A1 | 10/2002 | Chen |

(Continued)

*Primary Examiner* — Adam Lee
(74) *Attorney, Agent, or Firm* — Garlick & Markison; Edward J. Marshall

(57) ABSTRACT

A scheduling order can be designated for the broadcast and playback of multimedia content (e.g., music, news, other audio, advertising, etc) with respect to slots within the scheduling order. The broadcast day is divided into dayparts having blocks of time and including multiple time slots. One of those time slots, a transition period, is adjacent to another daypart. The transition period may be scheduled using a different algorithm for adjacency scheduling to satisfy both horizontal and vertical adjacency requirements. The remaining slots for the schedule can be scheduled from one or more categories of media items associated with the block being scheduled.

18 Claims, 8 Drawing Sheets

(56) References Cited

U.S. PATENT DOCUMENTS

| | | |
|---|---|---|
| 2003/0058707 A1* | 3/2003 | Dilger .................. G06Q 30/02 365/200 |
| 2003/0105809 A1 | 6/2003 | Yoshii et al. |
| 2003/0135536 A1 | 7/2003 | Lyons |
| 2005/0022245 A1 | 1/2005 | Nallur et al. |
| 2005/0039206 A1* | 2/2005 | Opdycke ............... G06Q 30/02 725/35 |
| 2005/0108770 A1* | 5/2005 | Karaoguz ......... H04L 29/06027 725/131 |
| 2005/0154625 A1 | 7/2005 | Chua et al. |
| 2005/0268299 A1 | 12/2005 | Picinich et al. |
| 2006/0026052 A1 | 2/2006 | Klett et al. |
| 2006/0218602 A1 | 9/2006 | Sherer et al. |
| 2006/0239640 A1 | 10/2006 | Watanabe et al. |
| 2007/0022032 A1* | 1/2007 | Anderson ............... G06Q 30/02 705/35 |
| 2007/0118590 A1 | 5/2007 | Giacalone |
| 2007/0130009 A1* | 6/2007 | Steelberg ........... G06Q 30/0247 705/14.46 |
| 2008/0155616 A1 | 6/2008 | Logan et al. |
| 2008/0229317 A1 | 9/2008 | Hodson |
| 2009/0006599 A1 | 1/2009 | Brownrigg, Jr. |
| 2009/0097819 A1 | 4/2009 | Dui et al. |
| 2009/0129402 A1 | 5/2009 | Moller et al. |
| 2009/0175591 A1 | 7/2009 | Gondhalekar et al. |
| 2009/0187951 A1* | 7/2009 | McCarthy ................ H04N 5/76 725/58 |
| 2009/0190898 A1 | 7/2009 | Saito |
| 2009/0198358 A1 | 8/2009 | Logan et al. |
| 2009/0240721 A1 | 9/2009 | Giacalone, Jr. |
| 2010/0070996 A1 | 3/2010 | Liao et al. |
| 2010/0082376 A1 | 4/2010 | Levitt |
| 2010/0268361 A1 | 10/2010 | Mantel et al. |
| 2011/0154382 A1 | 6/2011 | Chow et al. |
| 2012/0042315 A1 | 2/2012 | Attwell |
| 2012/0042316 A1 | 2/2012 | Attwell |
| 2012/0089730 A1 | 4/2012 | Bodi et al. |

\* cited by examiner

|  | 10A | 11A | 12P | 1P | 2P | 3P | 4P | 5P |
|---|---|---|---|---|---|---|---|---|
| Monday | 1 | 2 | 1 | 2 | 1 | 1 | 2 | 3 |
| Tuesday | 2 | 1 | 2 | 1 | 2 | 2 | 3 | 4 |
| Wednesday | 1 | 2 | 1 | 2 | 1 | 3 | 4 | 5 |
| Thursday | 2 | 1 | 2 | 1 | 2 | 4 | 5 | 1 |
| Friday | 1 | 2 | 1 | 2 | 1 | 5 | 1 | 2 |
| Saturday | 2 | 1 | 2 | 1 | 2 | 1 | 2 | 3 |
| Sunday | 1 | 2 | 1 | 2 | 1 | 2 | 3 | 4 |

FIG. 4a

| 400 | 10A | 11A | 12P | 1P | 2P | 3P | 4P | 5P |
|---|---|---|---|---|---|---|---|---|
| Monday | 1 | 2 | 1 | 2 | 1 | 2 | 3 | 4 |
| Tuesday | 2 | 1 | 2 | 1 | 2 | 1 | 2 | 3 |
| Wednesday | 1 | 2 | 1 | 2 | 1 | 3 | 4 | 5 |
| Thursday | 2 | 1 | 2 | 1 | 2 | 4 | 5 | 1 |
| Friday | 1 | 2 | 1 | 2 | 1 | 5 | 1 | 2 |
| Saturday | 2 | 1 | 2 | 1 | 2 | 2 | 3 | 4 |
| Sunday | 1 | 2 | 1 | 2 | 1 | 1 | 2 | 3 |

| 400 | 10A | 11A | 12P | 1P | 2P | 3P | 4P | 5P |
|---|---|---|---|---|---|---|---|---|
| Monday | 1 | 2 | 1 | 2 | 1 | 2 | 3 | 4 |
| Tuesday | 2 | 1 | 2 | 1 | 2 | 1 | 2 | 3 |
| Wednesday | 1 | 2 | 1 | 2 | 1 | 3 | 4 | 5 |
| Thursday | 2 | 1 | 2 | 1 | 2 | 4 | 5 | 1 |
| Friday | 1 | 2 | 1 | 2 | 1 | 5 | 1 | 2 |
| Saturday | 2 | 1 | 2 | 1 | 2 | 1 | 2 | 3 |
| Sunday | 1 | 2 | 1 | 2 | 1 | 2 | 3 | 4 |

METHOD AND SYSTEM FOR CONTROLLING A SCHEDULING ORDER OF MULTIMEDIA CONTENT FOR A BROADCAST

CROSS-REFERENCE TO RELATED APPLICATIONS

The present U.S. Utility Patent Application claims priority pursuant to 35 U.S.C. § 120 as a continuation of U.S. Utility application Ser. No. 13/940,877, entitled METHOD AND SYSTEM FOR CONTROLLING A SCHEDULING ORDER," filed Jul. 12, 2013, which is a continuation of U.S. Utility application Ser. No. 12/914,000, entitled METHOD AND SYSTEM FOR CONTROLLING A SCHEDULING ORDER PER DAYPART CATEGORY IN A MUSIC SCHEDULING SYSTEM, filed Oct. 28, 2010, issued as U.S. Pat. No. 8,490,099 on Jul. 16, 2013, which is a continuation-in-part of U.S. Utility application Ser. No. 12/856,952, entitled METHOD AND SYSTEM FOR CONTROLLING A SCHEDULING ORDER PER CATEGORY IN A MUSIC SCHEDULING SYSTEM, issued as U.S. Pat. No. 8,418,182 on Apr. 9, 2013, all of which are hereby incorporated herein by reference in their entirety and made part of the present U.S. Utility Patent Application for all purposes.

TECHNICAL FIELD

Embodiments are generally related to the scheduling of the delivery and airplay of multimedia content. Embodiments are additionally related to airplay of audio, including music, over radio stations and networks of radio stations. Embodiments further relate to a slotted-by-daypart multimedia scheduling technique.

BACKGROUND

Most radio stations employ a music director to select and schedule music and other multimedia programming for airplay. A typical music director is responsible for interacting with record company reps, auditioning new music, and making decisions (sometimes in conjunction with a program director) as to which songs get airplay, how much and when. At most radio stations today, the music director devises rotations for songs and programs the daily music through specialized music software made just for this purpose.

Music directors often have difficulty in evenly programming daily rotations to prevent repeat multimedia plays. If the music director fails to account for the content of programming in different day parts of a programming day, the listener could be exposed to repeated programming. Music directors often hand-place songs to try and prevent these clashes between day parts. It is difficult, however, for a music director to adjust program content in a way that will prevent programming clashes later in the day yet still maintain good rotation of the content within a day part. Only as the music director approaches the upcoming day parts would the director see the programming clashes. Having to re-program much of the day's content to correct the clashing rotations is inefficient.

Therefore, a need exists to provide a station's music director with an efficient system and method for scheduling a multimedia's programming day depending on song selection and good horizontal and vertical rotation during different dayparts. A dynamic music scheduling system can be provided for automatic adjustments in playlists or guidance for a station's music director for manual music placement.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an, improved scheduling method and/or apparatus for use in the context of radio stations and networks of radio stations.

It is another aspect of the disclosed embodiments to provide for a method and/or apparatus for controlling the scheduling of multimedia content such as audio and music for airplay per category.

It is yet another aspect of the disclosed embodiments to provide for a method and/or apparatus for dynamic multimedia scheduling to prevent repeated multimedia airplay in consecutive timeslots.

The aforementioned aspects and other objectives and advantages can now be achieved as described herein. An apparatus and method for a multimedia schedule for broadcast, which includes selecting the multimedia schedule for the broadcast via a user interface, and determining whether a slot from a plurality of slots of a daypart for a day is a transition period of the daypart. When the slot to be scheduled is the transition period of the daypart, horizontal and vertical adjacency requirements are addressed.

In an aspect of the embodiment, horizontal adjacency requirements are satisfied for the transition period by modifying the multimedia schedule with a multimedia content such that the multimedia content is not also scheduled in an adjacent slot of the day relative to the transition period of the daypart.

In another aspect of the embodiment, vertical adjacency requirements are satisfied for the transition period by modifying the multimedia schedule with the multimedia content such that the multimedia content is not also scheduled during a same daypart across an adjacent day that is relative to the day.

The apparatus and method are operable to produce a modified multimedia schedule for the broadcast, and display the modified multimedia schedule for the broadcast.

BRIEF DESCRIPTION OF THE DRAWINGS

The accompanying figures, in which like reference numerals refer to identical or functionally-similar elements throughout the separate views and which are incorporated in and form a part of the specification, further illustrate the present embodiments, and, together with the detailed description, serve to explain the principles herein.

FIG. 4b illustrates an example of a graphically displayed table for a slotted-by-daypart scheduling technique, in accordance with the disclosed embodiments;

FIG. 4c illustrates an example of a graphically displayed table for a slotted-by-daypart scheduling technique, in accordance with the disclosed embodiments;

FIG. 4d illustrates an example of a graphically displayed table for a slotted-by-daypart scheduling technique, in accordance with the disclosed embodiments.

DETAILED DESCRIPTION

The particular values and configurations discussed in these non-limiting examples can be varied and are cited merely to illustrate at least one embodiment and are not intended to limit the scope thereof.

The following discussion is intended to provide a brief, general description of suitable computing environments in which the system and method may be implemented. Although not required, the disclosed embodiments are generally described in the general context of computer-executable instructions such as, for example, one or more program modules, which can be executed by a processor, computer, or a group of interconnected computers.

Also, dayparts of a multimedia schedule may be scheduled in chronological order within a broadcast day. When scheduling dayparts in a forward chronological order, dayparts occurring earlier in said broadcast day are scheduled first, followed by scheduling consecutively later dayparts. Conversely, when scheduling dayparts in a reverse chronological order, dayparts occurring later in said broadcast day are scheduled first, followed by scheduling consecutively earlier dayparts.

As noted above, the embodiments provided herein can be understood, in a general sense, to schedule multimedia content such that multimedia content is not scheduled adjacent to itself in a broadcast day and multimedia content is not scheduled in the same daypart time slot in adjacent broadcast days.

Figure 1:
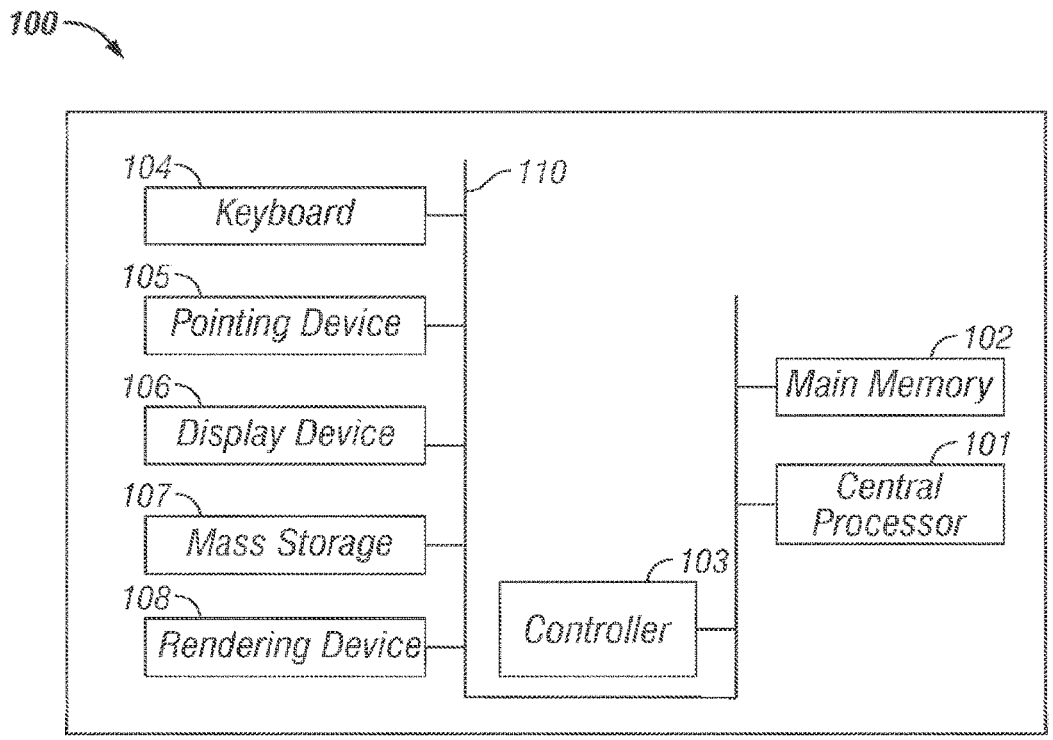
FIG. 1 illustrates a schematic view of a data-processing system in which the disclosed embodiments may be implemented.
Figure 2:
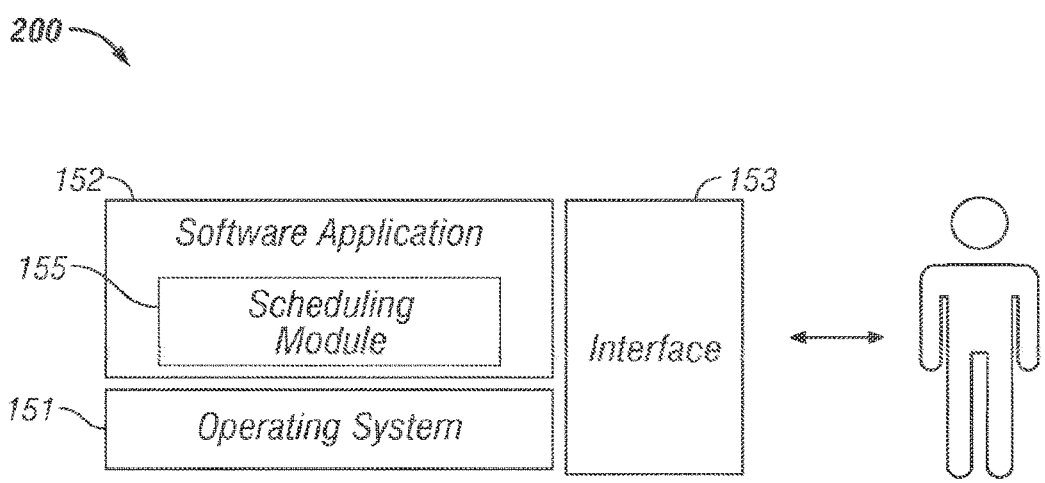
FIG. 2 illustrates a schematic view of a software system including an operating system, application software, and a user interface for carrying out the disclosed embodiments.

FIGS. 1 and 2 are provided as exemplary diagrams of a data processing environment in which embodiments may be implemented. It should be appreciated that FIGS. 1-2 are only exemplary and are not intended to assert or imply any limitation with regard to the environments in which aspects or embodiments may be implemented. Many modifications to the depicted environments may be made without departing from the spirit and scope of the present invention.

As illustrated in FIG. 1, the disclosed embodiments may be implemented in the context of a data-processing system 100, which can be configured to include, for example, a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output components, such as a hardware interface 108, for example, may be electronically connected to the data-processing system 100 as desired. Note that such hardware interface 108 may constitute, for example, a USB (Universal Serial Bus) that allows other devices such as printers, fax machines, scanners, copiers, and so on, to communicate with the data-processing system 100.

Note that, as illustrated, the various components of the data-processing system 100 communicate through a system bus 110 or similar architecture. It can be appreciated that the data-processing system 100 may, in some embodiments, be implemented as a mobile computing device such as a Smartphone, laptop computer, Apple® iPhone®, etc. In other embodiments, the data-processing system 100 may function as a desktop computer, server, and the like, depending upon design considerations.

FIG. 2 illustrates a computer software system 200 for directing the operation of the data-processing system 100 depicted in FIG. 1. Software application 152, stored in main memory 102 and on mass storage 107, includes a kernel or operating system 151 and a shell or interface 153. One or more application programs, such as software application 152, may be "loaded" (i.e. transferred from mass storage 107 into the main memory 102) for execution by the data-processing system 100. The data-processing system 100 receives user commands and data through user interface 153; these inputs may then be acted upon by the data-processing system 100 in accordance with instructions from operating system 151 and/or application 152.

Note that the term module as utilized herein may refer to a collection of routines and data structures that perform a particular task or implement a particular abstract data type. Modules may be composed of two parts: an interface, which lists the constants, data types, variable, and routines that can be accessed by other modules or routines, and an implementation, which is typically private (accessible only to that module) and includes a source code that actually implements the routines in the module. The term module may also simply refer to an application such as a computer program design to assist in the performance of a specific task such as word processing, accounting, inventory management, music program scheduling, etc.

Generally, program modules include routines, programs, objects, components, data structures, etc., that perform particular tasks or implement particular abstract data types. Moreover, those skilled in the art will appreciate that the disclosed method and system may be practiced with other computer system configurations such as, for example, hand-held devices, multi-processor systems, microprocessor-based or programmable consumer electronics, networked PCs, minicomputers, mainframe computers, and the like.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 152 can include a scheduling module 155 that can be adapted to control scheduling with respect to the delivery and airplay of multimedia content, as described in greater detail herein. The software application 152 can also be configured to communicate with the interface 153 and various components and other modules and features as described herein. The module 155, in particular, can implement instructions for carrying out, for example, the method 300 depicted in FIG. 3 and/or additional operations as described herein.

Figure 3:
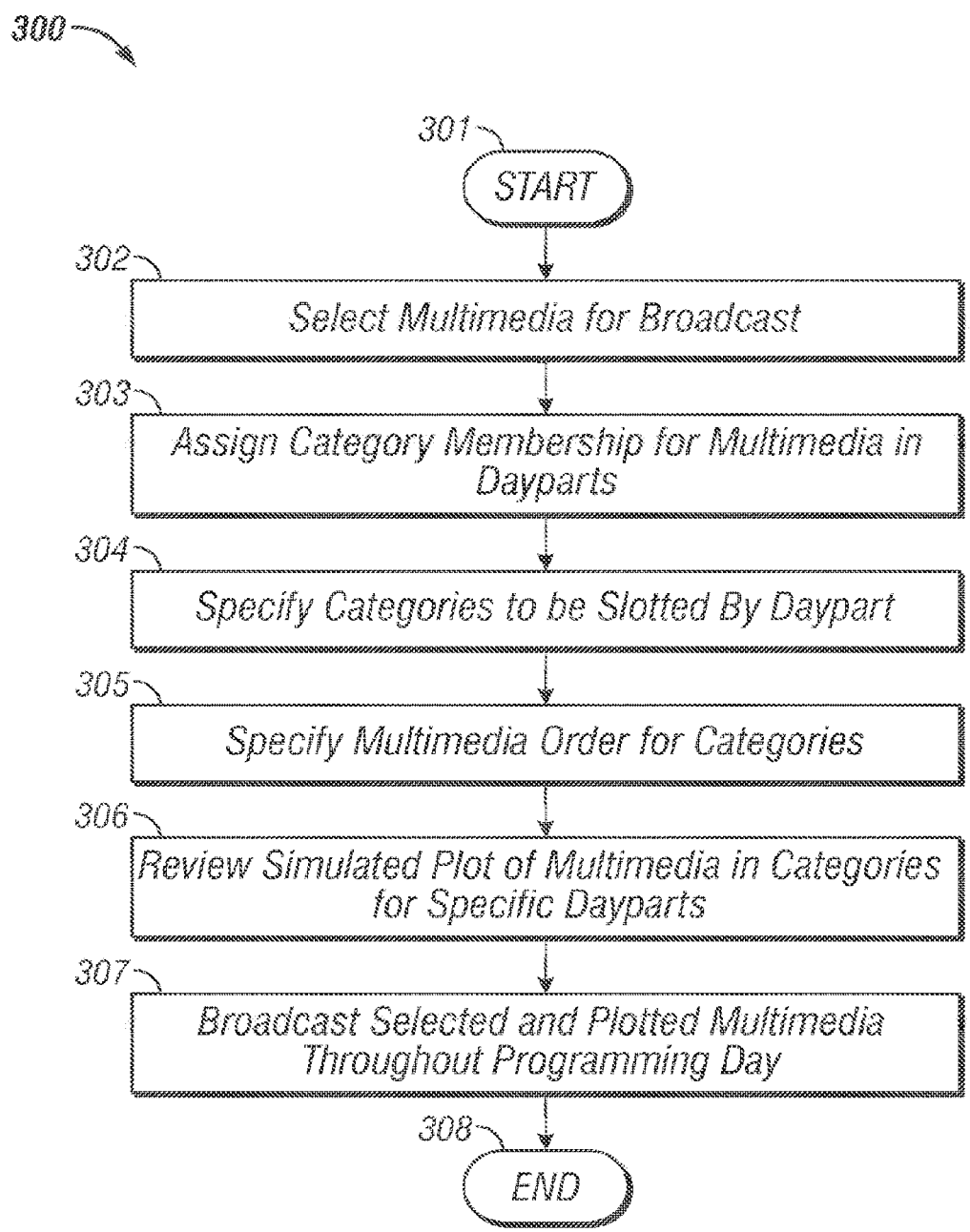
FIG. 3 illustrates a flow chart of operations depicting logical operational steps of a method for defining the slotted-by-daypart categories in a slotted-by-daypart multimedia schedule, in accordance with the disclosed embodiments.

FIG. 3 illustrates a flow chart of operations depicting logical operational steps of a method 300 for defining the slotted-by-daypart categories when controlling a scheduling order per daypart category, in accordance with the disclosed embodiments. The method 300 offers the ability to dynamically schedule multimedia for a programming day and set such a scheduling order as a slotted-by-daypart category. The dynamic music scheduling method can provide for automatic adjustments in playlists or guidance for a station's music director for manual music placement.

As illustrated at block 301, the process for controlling a scheduling order per daypart category can be initiated. Next, as illustrated at block 302, an operation can be processed to select multimedia for broadcast. Thereafter, category membership for multimedia in dayparts is assigned, as illustrated at block 303. As illustrated in block 304, categories to be scheduled using the disclosed slotted-by-daypart scheduling technique are specified. Thereafter, as illustrated in block 305, the multimedia order for slotted-by-daypart categories is specified. Next, the simulated plot of multimedia in categories for specific dayparts is reviewed, as illustrated in block 306. The selected and plotted multimedia is then broadcasted accordingly throughout the programming day, as depicted in block 307. The process then terminates, as illustrated in block 308.

As indicated above, the method 300 for controlling a scheduling order per daypart category can be implemented in the context of a module or group of modules. Such modules include computer implementable instructions for performing instructions including the individual operational steps indicated in the various blocks depicted in FIG. 3. Note that various software applications and implementations may be configured to provide one or more of the instructions illustrated in FIG. 3. One possibility involves configuring a database and associated modules to designate such scheduling control.

Other potential design aspects include modifying the daypart order by exposing the "Slotted-by-daypart" property in a scheduling order dialog. Note that as utilized herein the term "dialog" refers to a "dialog box," which is a special feature or window utilized in the context of a GUI (Graphical User Interface) such as, for example, the interface 153 of FIG. 2, to display information to a user, or to obtain a response, if required. A "dialog" refers to a dialog between a data-processing system such as that described herein with respect to FIGS. 1-2 and the user. The data-processing system informs the user of something, requests input from the user, or both. Such a dialog or dialog box provides controls that allow a user to specify how to carry out a particular action.

Figure 4A:
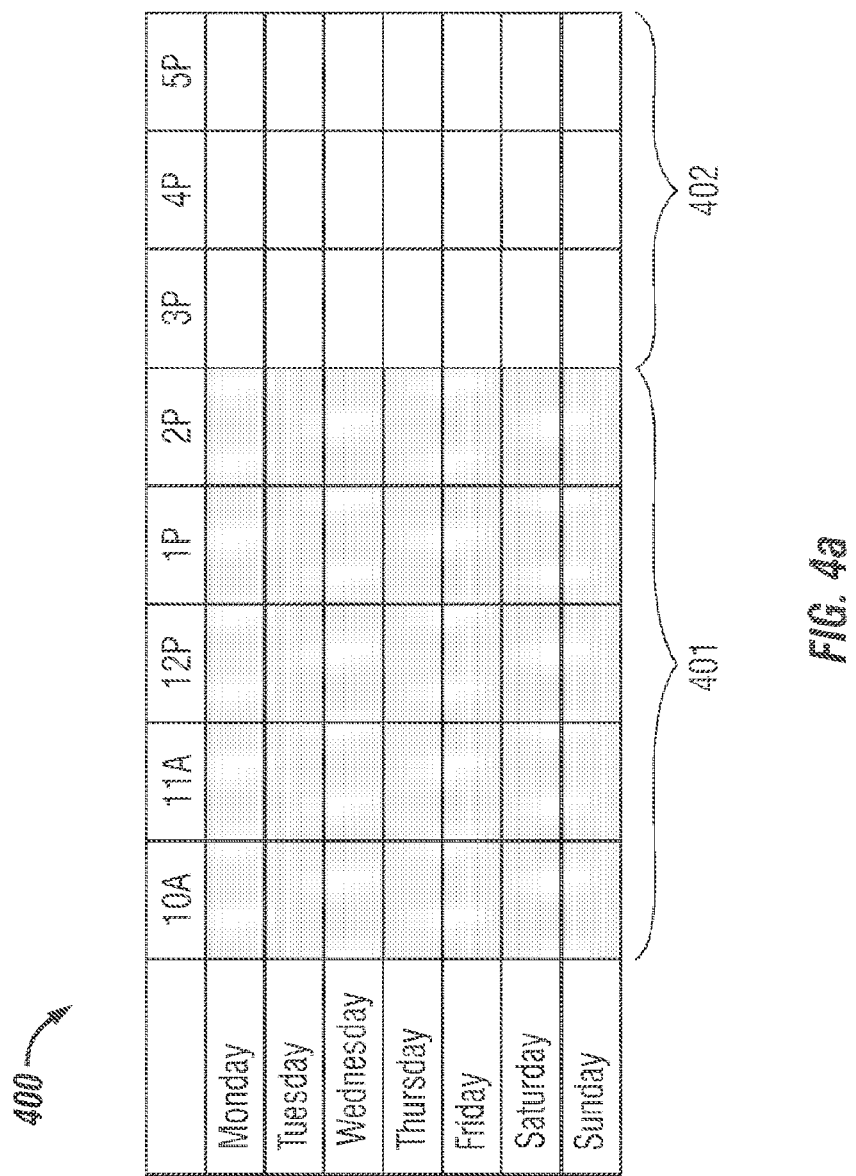
FIG. 4a illustrates an example of a graphically displayed table for a slotted-by-daypart scheduling technique, in accordance with the disclosed embodiments.

FIG. 4a illustrates an example of a graphically displayed table for a slotted-by-daypart scheduling technique 400, in accordance with the disclosed embodiments. A. broadcast day consists of twenty-four contiguous hours, normally beginning at midnight, but can conceivably begin at any arbitrary hour of the day. The broadcast day can be logically divided into segments, known as dayparts. A daypart is a block of consecutive hours, ranging in length from one hour up to twenty-four hours. For example, dayparts are typically four or five hours long 401. The broadcast day will consist of approximately, for example, five different dayparts, but any number and combination of daypart sizes are allowed 401, 402, as long as the broadcast day is filled with scheduled multimedia. It is understood that any number of dayparts with varying length can be assigned throughout a programming day.

Multimedia entities such as songs, for example, are assigned to categories to enable the songs to be scheduled. Within any broadcast day, songs will be scheduled according to pre-determined category positions during the broadcast day. At any position in the schedule designated for a specific category, only songs assigned to that particular category can be scheduled. Multiple categories may be scheduled in any daypart.

The relationship between categories and dayparts is a virtual one derived from the hour of the day associated with schedule positions for a particular category and the time period that a daypart occupies. Multiple categories can be scheduled in each hour, enabling virtual relationships to be established between a daypart and each of those categories. Dayparts are scheduled in chronological order. Schedule positions within each daypart are scheduled according to the Reverse Scheduling rules established for each category/daypart pairing. For example, in any category, dayparts in which the category is scheduled in a forward manner will be scheduled first in an earliest to latest position order. Dayparts in which the category is reverse scheduled will be scheduled last in a latest to earliest position order.

Categories are also scheduled according to pass order, wherein the lowest pass order is considered first, and each category is assigned a pass order. Songs may be re-assigned to alternate categories in any daypart. Consequently, when scheduling positions for dayparts in which songs have been assigned to alternate categories, the scheduler can have an alternate set of songs from which to select. In any daypart, the set of available songs may be larger or smaller than the original category assignment when additional songs are assigned to the original category. Conversely, the additional songs that would normally be in this category could be assigned to an alternate category in this daypart. In any daypart, a particular song may only be assigned to a single daypart. In practice, this process can be described with the following example.

FIG. 4b further illustrates an example of a graphically displayed table for a slotted-by-daypart scheduling technique 400, in accordance with the disclosed embodiments. Category A 405 has five songs assigned in the daypart 10A-2P 403 which occupies the 10 am thru 2 pm hours, and daypart 3P-5P 404 which occupies the 3 pm thru 5 pm hours. The schedule requires that a single Category A 405 song be scheduled in each of the hours between 10 am and 2 pm, inclusively. During the 3P-5P daypart 404, there are no alternate categories assigned, thus allowing all of the 5 songs in Category A 405 to be considered. During the 10A-2P daypart 403, however, 3 of the 5 songs normally assigned to Category A 405 have been re-assigned to a different category, resulting in only 2 songs remaining in Category A 405 during the 10A-2P daypart 403. This smaller set of songs assigned to Category A 405 in the 10A-2P daypart 403 will have a higher rotation than the larger set of songs assigned to Category A 405 in the 3P-5P daypart 404. Songs are represented as 1, 2, 3, 4 or 5, hence song 1 plays in every alternate hour of the 10A-2P daypart 403 and also in every 5th hour of the 3P-5P daypart 404.

To provide a way to allow songs to be scheduled evenly, categories may also be designated as 'slotted-by-daypart.' This indicates that the scheduling algorithm will employ a method whereby available songs will be selected in strict rotation. Once the rotation is established, it will remain the same until altered by the user, thus forcing an even, predictable distribution of the available songs during any given daypart. This scheduling algorithm is typically employed to schedule high turnover songs (i.e. categories containing few songs) where a fixed rotation is desirable.

The horizontal rotation of songs assigned to Category A 405 in any given daypart must also be protected against a play of the same song in the same hour in the previous day's daypart. A play of a song in the same hour of adjacent days is deemed vertical rotation. Hence, an even vertical rotation of songs is also desirable. The strict rotation of Category A 405 songs in any given daypart ensures both a horizontal (i.e. within daypart) and vertical (i.e. across days) rotation, whereby no song plays adjacent to itself within a day or in the same hour in adjacent days. Good horizontal and vertical rotation can be achieved by seeding the first Category A 405 position in any daypart, known as the transition period, with a song, which satisfies both horizontal and vertical adjacency requirements.

FIG. 4b further illustrates both the horizontal and vertical rotations, with two songs available in the 10A-2P daypart 403 and five songs available in the 3P-5P daypart 404. The transition period of the 3P-5P daypart falls in the 3P hour 407. Because the Slotted-by-Daypart scheduling technique works by selecting songs via a simple rotation, whereby filling a schedule position for a particular category is achieved by selecting the next available song assigned to that category in a given daypart, it is possible to create undesirable conditions. For example, when a song is scheduled in one particular daypart, it may be scheduled adjacent to the same song in an adjacent daypart, as shown in the 2P/3P 406, 407 transition on Monday 408 and Tuesday 409 in FIG. 4b.

To prevent this adjacency conflict 410, the song selected to fill the transition period for a given category in any daypart is achieved using a different scheduling algorithm to fill the other Category A 405 positions in any given daypart. In this transition period, the songs are ordered in a "next due in hour" manner. Songs which have never played during this transition period in previous days, or played furthest in the past during this hour in previous days, will be considered first for scheduling. To avoid any song adjacency conflicts with previously scheduled dayparts in which the song may have been previously scheduled, it is possible to reject the intended song in favor of the next available in the order. The ordered songs will be considered in turn until a song without adjacency conflicts is found. On subsequent days, the list will be re-ordered in a next due fashion again to ensure songs receive their share of plays in a "particular vertical rotation".

The adjacency conflict of songs 1 and 2 on Monday 408 and Tuesday 409 is resolved 415 by selecting the next due song in 3P 407 that has no adjacency conflict. As illustrated in FIG. 4c, resolving 415 this conflict creates another adjacency conflict 411 of songs 1 and 2 in the 2P/3P transition on Saturday 412 and Sunday 413.

As illustrated in FIG. 4d, the adjacency conflict on Saturday 412 and Sunday 413 is resolved 414 by selecting the next due song in 3P which has no adjacency conflict. The net result of the protection given to the transition period in 3P is that the vertical scheduling order will not always be the same as the horizontal scheduling order. Horizontal rotations are always optimal in a single broadcast day, as well as over multiple days, because of the disclosed embodiment's continued attempts to schedule the next due song in the transition hour. Therefore, the overall rotations of songs in this hour will even out. Multiple categories can also be scheduled in this manner. Each category will have its own transition period in the 3P hour, at which vertical and horizontal rotations are protected against adjacent song plays.

Figure 5:
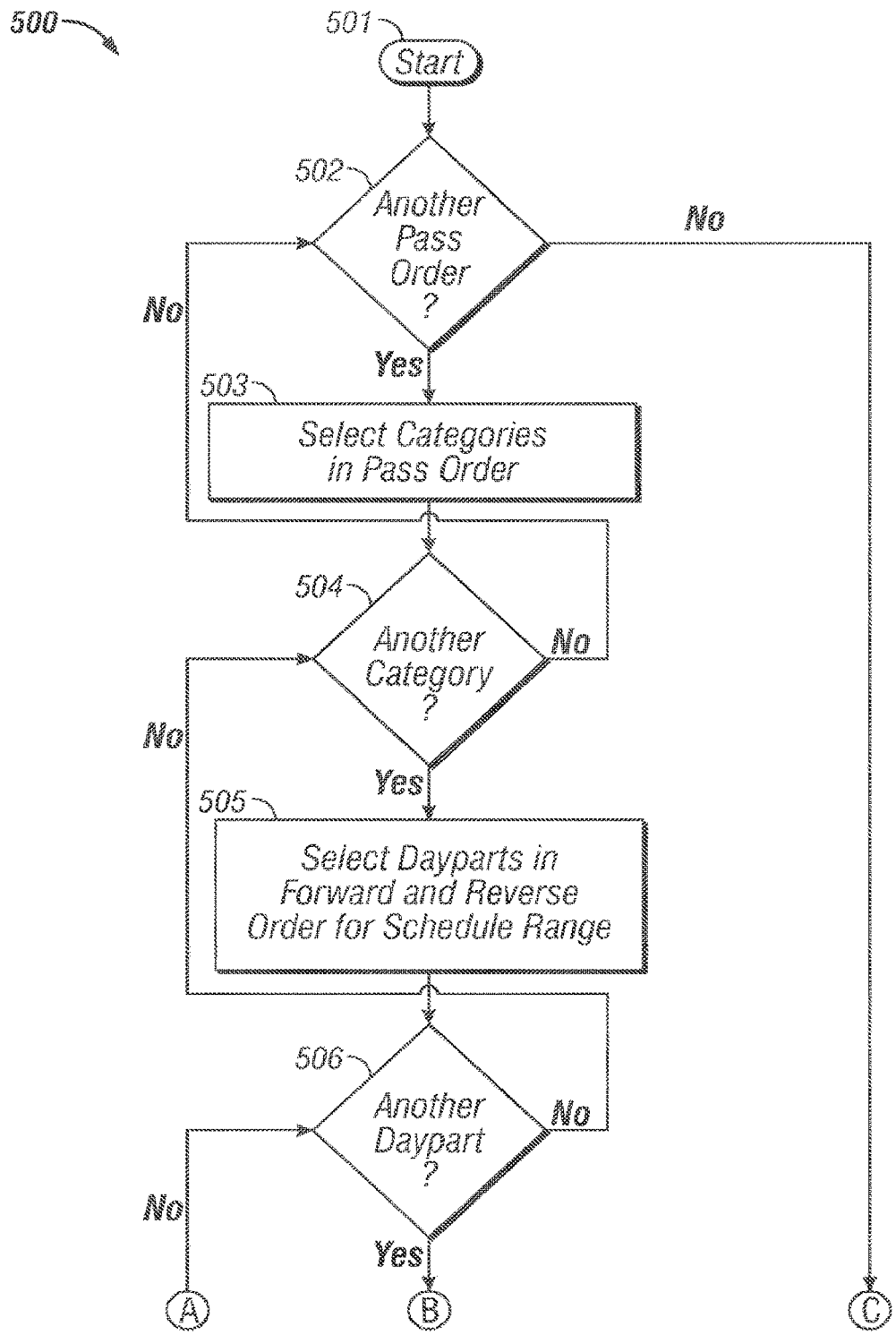
FIG. 5 illustrates a flow chart of operations depicting logical operational steps of a method for defining categories and plotting a slotted-by-daypart multimedia schedule, in accordance with the disclosed embodiments.
Figure 5:
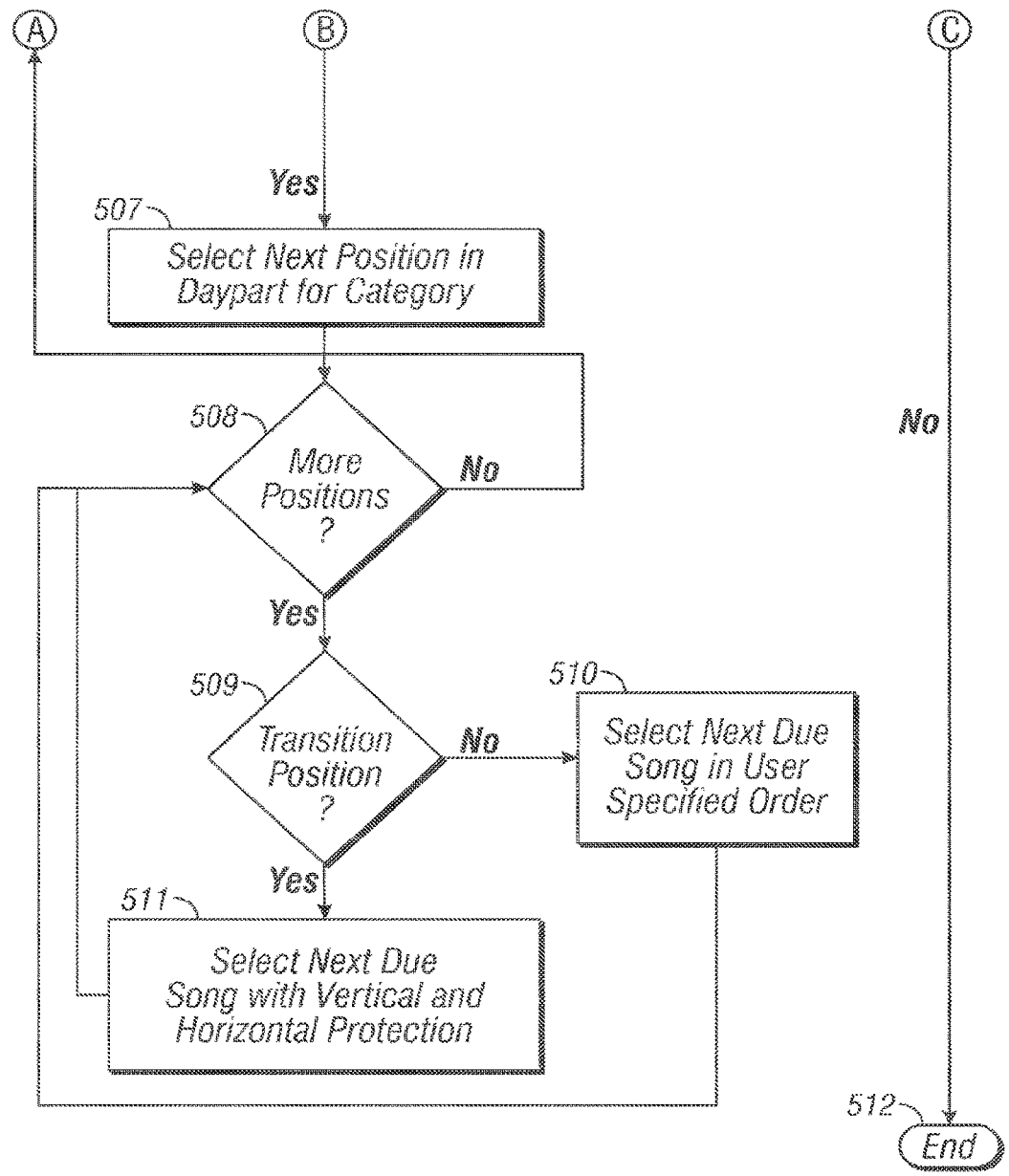

FIG. 5 illustrates a flow chart of operations depicting logical operational steps of a method 500 for defining categories and plotting a slotted-by-daypart multimedia schedule, in accordance with the disclosed embodiments. As illustrated at block 501, the process for scheduling multimedia using a slotted-by-daypart scheduling technique can be initiated. Next, as illustrated at block 502, an operation can be processed to determine if there is a pass order remaining to be scheduled. If no pass order remains, then the operation ends as illustrated at block 512. Otherwise, the categories designated for the pass order are selected, as illustrated at block 503. Next, as illustrated at block 504, an operation can be processed to determine if all categories on the pass order have been scheduled. If another category remains, then an operation can be processed to select dayparts in forward and reverse order for the schedule range, as illustrated at block 505. If no other categories remain for the pass, then the scheduling operation skips to block 506, where an operation can be processed to determine if another daypart still needs to be scheduled.

If another day part needs to be scheduled, then an operation can be processed to select the next unscheduled position in the daypart for the category, as illustrated at block 507. If there are no dayparts remaining to be scheduled, then the scheduling operation skips to block 508, where an operation can be processed to determine the next unscheduled position in the daypart. It is then determined whether -the next unscheduled position is a transition position that affects the rotation, as illustrated at block 509. If it is a transition position, then an operation can be processed to select the next due song with proper vertical and horizontal protection, as illustrated at block 511. If the transition position does not affect the rotation, then an operation can be processed to select the next due song in a user-specified order, as illustrated at block 510. The process then terminates as illustrated at block 512.

It will be appreciated that variations of the above-disclosed and other features and functions, or alternatives thereof, can be desirably combined into many other different systems or applications. Furthermore, various presently unforeseen or unanticipated alternatives, modifications, variations or improvements therein may be subsequently made by those skilled in the art which are also intended to be encompassed by the following claims.

What is claimed is:

1. A method executed by a computing device for populating a multimedia schedule for broadcast, the method comprising:

selecting, via a user interface of the computing device, a plurality of multimedia content corresponding to at least one multimedia category;

performing a first portion of an automated scheduling task by scheduling a first daypart and an adjacent second daypart of a plurality of dayparts of a first day with the plurality of multimedia content using a forward scheduling algorithm, wherein the first daypart and the second daypart have respective first and second transition periods adjacent to one another;

performing a second portion of the automated scheduling task by scheduling a third daypart and an adjacent fourth daypart of a second plurality of dayparts of a second day being adjacent the first day with the plurality of multimedia content using the forward scheduling algorithm, wherein the third daypart and the fourth daypart have respective third and fourth transition periods adjacent to one another;

performing a third portion of the automated scheduling task by scheduling the first, second, third and fourth transition periods using a reverse scheduling algorithm, the reverse scheduling algorithm satisfying both horizontal and vertical adjacency requirements, wherein the horizontal adjacency requirements include a requirement that a multimedia content of the plurality of multimedia content is not also scheduled in adjacent transition periods of adjacent dayparts, and the vertical adjacency requirements include a requirement that the multimedia content of the plurality of multimedia content is not also scheduled during an equivalent transition period of the second day; and broadcasting the plurality of multimedia content in accordance with the first, second, and third portions of the automated scheduling task.

2. The method of claim 1, wherein:

the first and the third dayparts have a first block of time; and the second and the fourth dayparts have a second block of time.

3. The method of claim 2, wherein:

the first block of time is different from the second block of time.

4. The method of claim 1, wherein the reverse scheduling algorithm further comprises:

selecting the plurality of multimedia content for inclusion in a first, second, third or fourth transition period by determining how long it has been since the plurality of multimedia content have been previously scheduled for inclusion in a corresponding schedule slot.

5. The method of claim 1, further comprising:

assigning the first daypart to a plurality of multimedia content categories; and wherein the forward scheduling algorithm includes scheduling the first daypart using a horizontal rotation that selects a next available multimedia content from the at least one multimedia category.

6. The method of claim 5, further comprising:

seeding at least one of the first and second transition periods with a media item satisfying both the horizontal adjacency requirements and vertical adjacency requirements.

7. The method of claim 1, further comprising:

assigning the first daypart to a plurality of multimedia content categories; and wherein at least the forward scheduling algorithm includes:

selecting one of the multimedia content categories of the plurality of multimedia categories according to pass order; and scheduling a schedule slot to include a multimedia content selected from the at least one multimedia category.

8. The method of claim 1, wherein the computing device comprising at least one of:

a smartphone; and a laptop computer.

9. A method executed by a computing device for modifying a multimedia schedule for broadcast, the method comprising:

selecting the multimedia schedule for the broadcast via a graphic user interface;

determining whether a slot from a plurality of slots of a daypart for a day is a transition period of the daypart; and when the slot to be scheduled is the transition period of the daypart, employing a scheduling algorithm selected based on a category associated with the transition period, to:

satisfy horizontal adjacency requirements for the transition period by modifying the multimedia schedule with a multimedia content such that the multimedia content is not also scheduled in an adjacent slot of the day relative to the transition period of the daypart; and satisfy vertical adjacency requirements for the transition period by modifying the multimedia schedule with the multimedia content such that the multimedia content is not also scheduled during a same daypart across an adjacent day that is relative to the day;

producing a modified multimedia schedule for the broadcast;

displaying the modified multimedia schedule for the broadcast; and broadcasting the multimedia content in accordance with the modified multimedia schedule.

10. The method of claim 9, further comprising:

when the slot to be scheduled is not a transition period for the daypart, selecting a next-due multimedia content from a category of multimedia content.

11. The method of claim 9, further comprising:

assigning a plurality of categories of multimedia contents to the daypart, wherein the selecting the multimedia content includes selecting a multimedia content from one of the plurality of categories of the plurality of multimedia content; and wherein any particular multimedia content is included in only a single category of multimedia content within the daypart.

12. The method of claim 11, further comprising:

assigning the multimedia content to a first category for scheduling the daypart; and assigning the same multimedia content to a different category for scheduling another daypart.

13. A computing device comprising:

a processor;

memory operably associated with the processor;

a graphic user interface operably associated with the processor and the memory; and a program of instructions configured to be stored in the memory and executed by the processor, the program of instructions including:

selecting, via the graphic user interface, a slot to be scheduled from a plurality of slots of a daypart for a day;

determining whether the slot to be scheduled is a transition period of the daypart;

when the slot to be scheduled is the transition period of the daypart, employing a scheduling algorithm selected based on a category associated with the transition period, to:

schedule a multimedia content for the transition period to satisfy horizontal adjacency requirements for the transition period such that the multimedia content is not also scheduled in adjacent slots of the day relative to the transition period of the daypart; and schedule the multimedia content for the transition period to also satisfy vertical adjacency requirements for the transition period such that the multimedia content is not also scheduled during a same daypart across an adjacent day relative to the day; and broadcast the multimedia content as scheduled.

14. The computing device of claim 13, wherein the program of instructions to schedule the multimedia content for the transition period further comprises:

selecting the multimedia contents for inclusion in the transition period when the multimedia content is scheduled for inclusion in a corresponding schedule slot on a non-adjacent day relative to the day.

15. The computing device of claim 13, wherein the program of instructions to schedule the multimedia content for the transition period further comprising:

select multimedia content for inclusion in the transition period by determining how long it has been since the multimedia content has been previously scheduled for inclusion in a corresponding daypart on a non-adjacent different day relative to the day.

16. The computing device of claim 13, wherein the program of instructions further comprises:

assigning a predetermined number of multimedia content categories to the daypart; and scheduling the daypart of the day by a horizontal rotation that selects a next available multimedia content from the predetermined number of multimedia content categories.

17. The computing device of claim 13, wherein the program of instructions further comprises:

assigning a plurality of multimedia content categories to the daypart; and wherein the scheduling includes:

selecting one of the plurality of multimedia categories according to pass order; and scheduling a schedule slot to include a multimedia content selected from the one of the plurality of multimedia categories.

18. The computing device of claim 13 comprising at least one of:

a smartphone; and a laptop computer.

* * * * *